United States Patent [19]

Jackson et al.

[11] 4,366,782
[45] Jan. 4, 1983

[54] METHOD OF FUEL TREATMENT AND DISTRIBUTION

[75] Inventors: Robert G. Jackson, Weston, Conn.; Heeyoung Yoon, McMurray, Pa.

[73] Assignee: Conoco Inc., Stamford, Conn.

[21] Appl. No.: 286,992

[22] Filed: Jul. 27, 1981

[51] Int. Cl.³ .............................................. F02M 27/02
[52] U.S. Cl. ........................................ 123/3; 123/557; 123/577
[58] Field of Search ................... 123/1 A, 3, 557, 525, 123/575, 577

[56] References Cited

U.S. PATENT DOCUMENTS

| | | | |
|---|---|---|---|
| 3,783,841 | 1/1974 | Hirschler, Jr. et al. | 123/1 A X |
| 4,021,370 | 5/1977 | Harris et al. | 48/197 R |
| 4,028,067 | 6/1977 | Gent | 48/197 R |
| 4,086,877 | 5/1978 | Henkel et al. | 123/1 A |
| 4,088,450 | 5/1978 | Kosaka et al. | 123/1 A |
| 4,091,086 | 5/1978 | Hindin et al. | 423/648 R |
| 4,282,835 | 8/1981 | Peterson et al. | 123/1 A |
| 4,312,317 | 1/1982 | Jewett et al. | 123/557 X |

FOREIGN PATENT DOCUMENTS

| | | |
|---|---|---|
| 1398 | 7/1980 | European Pat. Off. . |
| 55-1398 | 7/1980 | Japan ..................................... 123/3 |

Primary Examiner—William A. Cuchlinski, Jr.
Attorney, Agent, or Firm—Dale Lovercheck; William A. Mikesell, Jr.

[57] ABSTRACT

A fuel treatment and distribution apparatus for use with an internal combustion engine comprising an alcohol storage tank,
  a vaporizer,
  a catalyst containing reactor,
  a dissociated alcohol storage tank,
  and a by-pass conduit means,
    said alcohol storage tank being in fluid flow communication with said vaporizer means,
    said alcohol storage tank being in fluid flow communication with said by-pass conduit means,
    said vaporizer being in fluid flow communication with said catalyst containing reactor means,
    said catalyst containing reactor means being in fluid flow communication with said dissociated gas storage tank,
    said dissociated gas storage tank being in fluid flow communication and internal combustion engine
    said by-pass conduit means being in fluid flow communication with said internal combustion engine whereby peak operating capacity being handled by addition of liquid alcohol through said by-pass conduit.

5 Claims, 1 Drawing Figure

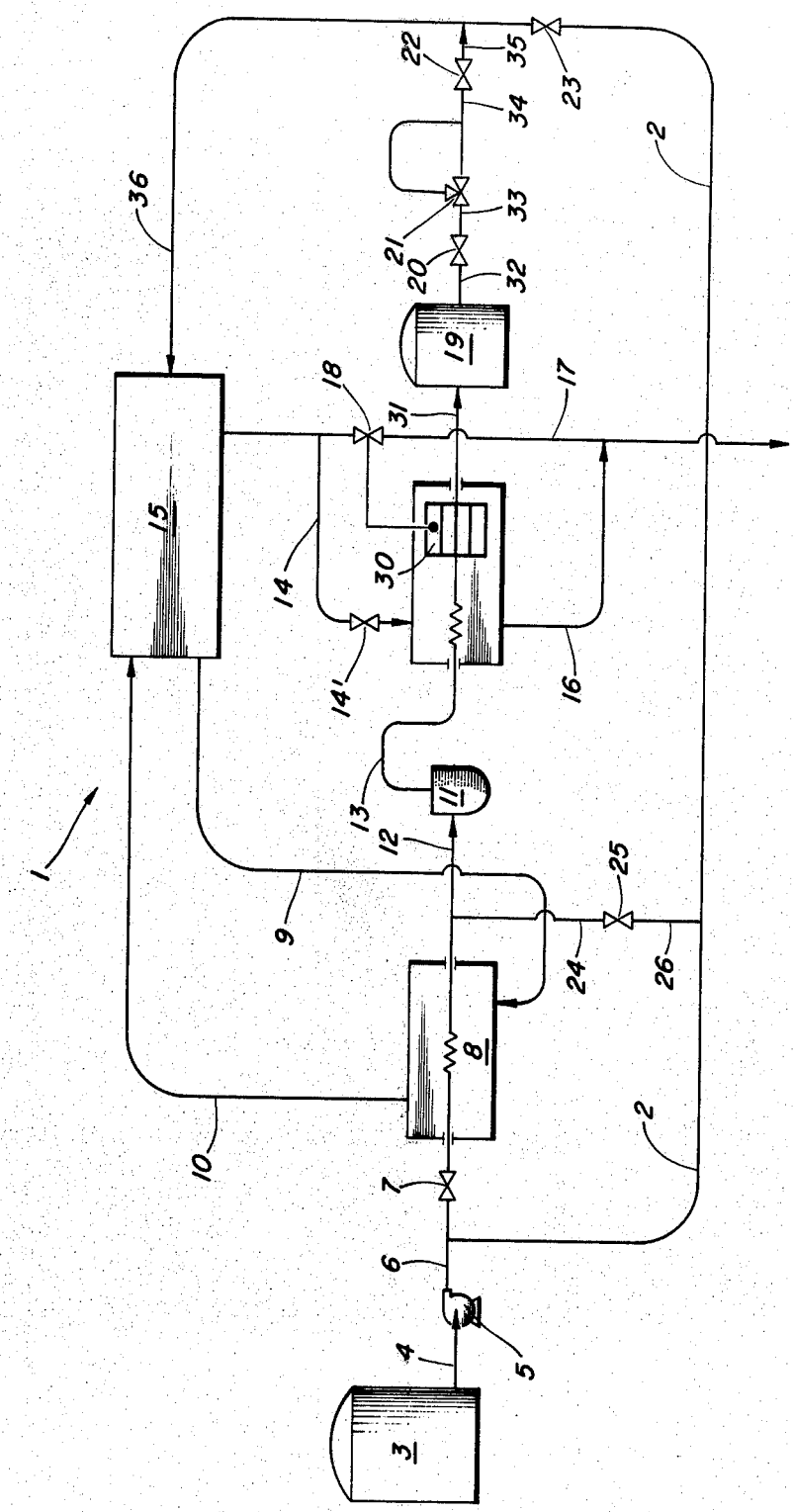

METHOD OF FUEL TREATMENT AND DISTRIBUTION

BACKGROUND OF THE INVENTION

Kosaka et al, discloses in U.S. Pat. No. 4,088,450 a plurality of catalysts arranged in a desirable order based on the temperature gradient existing in the reaction chamber. The operating temperature of the catalyst and the temperature of the portion of the reaction chamber it is in, are matched so as to avoid catalytic degradation and/or catalytic inactivity.

Hindin et al in U.S. Pat. No. 4,091,086 discloses a catalytic composition particularly useful in the production of hydrogen from methanol, especially by steam reforming, which comprises a mixture of zinc oxide, copper oxide, thorium oxide and aluminum oxide whereby the activity and activity maintenance of the catalytic composition is superior relative to a composition otherwise substantially the same but lacking thoria.

Henkel et al in U.S. Pat. No. 3,086,877 discloses a fuel gas obtained in a reformed gas generator through the catalytic reaction of hydrocarbons and a gas containing oxygen and provided to an internal combustion engine has its heat content along with that of the exhaust gas of the engine used to convert methanol endothermically into a gas mixture containing carbon monoxide and hydrogen with the gas mixture so formed fed to one or both the reformed gas generator and, along with the fuel gas, the internal combustion engine.

SUMMARY OF THE INVENTION

The known systems do not provide for feeding liquid methanol or liquid alcohol into the internal combustion engine either alone or after mixing with dissociated alcohol. Thus, the benefits of the present invention are not provided in Henkel et al. Namely, the advantage of providing a dissociater of a size suited to normal operation, with peak operating capacity being handled by addition of liquid methanol or liquid alcohol through an acceleration loop.

A fuel treatment and distribution apparatus for use with an internal combustion engine comprising,
an alcohol storage tank,
a vaporizer,
a catalyst containing reactor,
a gas storage tank,
and a by-pass conduit means,
the alcohol storage tank being fluid flow communication with the vaporizer means,
the alcohol storage tank being in fluid flow communication with the by-pass conduit means,
the vaporizer being in fluid flow communication with the catalyst containing reactor means,
the catalyst containing reactor means being in fluid flow communication with the gas storage tank,
the gas storage tank being in fluid flow communication with internal combustion engine, and the by-pass conduit means being in fluid flow communication with the internal combustion engine.

BRIEF DISCUSSION OF THE DRAWING

The FIGURE is a schematic representation of an apparatus in accordance with the present invention.

DETAILED DISCUSSION OF THE INVENTION

The invention relates to a fuel treatment and distribution apparatus and method as shown in the drawing.

As shown in the drawing, a fuel system is generally shown at 1. The fuel system 1 has a catalyst containing reactor 30 and a by-pass conduit 2. Liquid alcohol is stored in the liquid alcohol storage tank 3. From liquid alcohol storage tank 3 the liquid alcohol is conveyed in liquid alcohol conduit 4 by pump 5 to vaporizer feedline 6 and by-pass conduit 2. Liquid alcohol passes from vaporizer feedline 6 through solenoid valve 7 and into the vaporizer 8. The vaporizer 8 is heated by engine coolant which enters vaporizer 8 through vaporizer heat transfer feedline 9. From the vaporizer the engine coolant returns to the engine through vaporizer heat transfer fluid output line 10. The vaporized alcohol is conveyed from the vaporizer 8 to the liquid trap 11 by line 12 and from the liquid trap 11 through line 13 to the catalyst containing reactor 30. The catalyst containing reactor 30 operates at about 600° F. The vaporized alcohol is dissociated into hydrogen and carbon monoxide in the catalyst containing reactor 30. A preferred catalyst for dissociation in the catalyst bed of the catalyst containing reactor 30 is a copper zinc catalyst with or without promoters such as chromium. However the dissociater may be provided with a dual catalyst bed; one catalyst being a low temperature dissociation catalyst and the other catalyst being a high temperature dissociation catalyst. Useful as a low temperature catalyst is a copper/zinc catalyst with or without promoters. Useful as a high temperature catalyst is a zinc/-chromium catalyst. The advantage of having a dual catalyst bed is that the low temperature catalyst is protected from deactivation by thermal sintering because the dissociation reaction in the high temperature catalyst zone reduces the operating temperature of the low temperature catalyst bed. Thus, the vaporized alcohol first contacts the high temperature catalyst and then contacts the low temperature catalyst as it passes through the catalyst containing reactor 30 in a preferred embodiment of the invention.

In another preferred embodiment of the invention, the dissociation catalyst bed may be low temperature catalyst alone for example a copper/zinc catalyst as previously mentioned.

The catalyst containing reactor 30 and the superheater shown in the drawing are heated by exhaust from the internal combustion engine 15. Exhaust from the internal combustion engine 15 is conveyed by conduit 14 having solenoid valve 14' to the catalyst containing reactor 30. The engine exhaust leaves the catalyst containing reactor 30 through the conduit 16. This cooled engine exhaust may be recycled to the engine or exhausted to the atmosphere or partially recycled and partly exhausted to the atmosphere. The superheater shown in the drawing after line 13 and before reactor 30 heats the fuel which is heated to about 200° F. in vaporizer 8 and superheated to about 600° F. in the superheater.

An exhaust flow valve 18 is provided with temperature control, to control the temperature of the catalyst containing reactor 30. Engine exhaust from the engine 15 may be by-passed around the catalyst containing reactor 30 through the exhaust flow valve 18 and into the exhaust flow conduit 17. By controlling the amount of exhaust used to heat the catalyst containing reactor 30 the temperature of the catalyst containing reactor may be regulated. The exhaust flow valve 18 is connected to a temperature sensor on the reactor 30.

Dissociated alcohol from the catalyst containing reactor 30 passes through conduit 31 into storage tank 19. Storage tank 19 provides gas for use during startup and surge conditions such as acceleration. From the storage tank 19 gas travels through conduit 32 to the solenoid valve 20. From the solenoid valve 20 gas travels through line 33 to the pressure control valve 21. From the pressure control valve 21 the dissociated alcohol travels through line 34 to the dissociated gas control mechanism 22. From the dissociated gas control mechanism 22, the gas travels through line 35 to fuel feed conduit 36 into engine 15. The dissociated gas control mechanism 22 and the fuel flow mechanism 23 may be that of an automobile fuel injection system or an automobile carburetor.

Undissociated alcohol from by-pass conduit 2 also passes into fuel feed conduit 36. By-pass conduit 2 is provided with fuel flow mechanism 23. Fuel flow mechanism 23 controls the amount of undissociated alcohol to be fed into the internal combustion engine 15 via fuel feed conduit 36.

The preferred alcohol for use in the fuel system is methanol. Among the advantages of the system is that more fuel material may be passed into the internal combustion engine 15 during periods of peak operation, such as in the case where quantities of fuel in excess of those of normal operation are needed for example during startup and acceleration.

The line 24 connects evaporator 8 to valve 25. Line 26 connects valve 25 to line 2. Thus, evaporated methanol may be fed to line 2 to provide a mixed feed of vaporized methanol and liquid methanol to engine 15 via line 36.

Because of the capacity of the acceleration loop, the dissociation reactor need only be large enough to handle normal operation conditions. Periods of peak operation can be handled by the capacity of the acceleration loop.

During start-up the valves 7, 14' and 20 are in a closed position so that the liquid fuel from tank 3 is fed through line 2 to the engine 15. The fuel flow mechanism 23 controls the amount of liquid fuel being fed to the engine 15.

In another embodiment of the invention, the tank 3 may contain gasoline or alternatively, the tank 3 may contain an alcohol fuel and an additional tank not shown in the drawing may contain an alternative fuel such as gasoline, this additional tank not shown would be in fluid flow communication with line 2 for example by being connected to line 4. When operating on gasoline the valves 7, 14' and 20 are closed and the gasoline would be fed through the line 2 through the fuel flow mechanism 23 to the engine 15.

In start-up using methanol, for example, as the alcohol fuel, the valves 7, 14' and 20 are open so that methanol is fed through the line 2 directly into the engine and through valve 7 through the dissociation reactor 30. When the engine is turned off the valves 7, 14' and 20 are closed. In closing these valves dissociated gas is trapped in the storage tank 19.

In start-up, when the valves 14', 7 and 20 are opened, dissociated gas stored in storage tank 19 flows through valve 20 and into the line 36 to the engine as dissociated start-up fuel.

In an embodiment of the invention using more than one fuel tank, a selector switch which provides for the selection of which fuel is to be used is provided to control the feed valves from the storage tank for each fuel. In this embodiment of the invention, a valve would be placed in line 4 between the pump 5 and the storage tank 3. Additionally, the additional storage tank would be connected to the line 4. A valve would be placed in the line connecting the additional storage tank to line 4. A valve would be placed in the line 4 between the storage tank 3 and the line connecting line 4 with the additional storage tank. The selector switch would control the opening of the proportion of each fuel used or the selection of which fuel is used alone.

Where methanol is the fuel in storage tank 3, the reaction $$CH_3OH \rightarrow CO + 2H_2 \qquad (I)$$

takes place in reactor 30. In the engine 15, CO and $H_2$ from line 36 are mixed with $O_2$ for example in a carburetor with an air intake opening, and combusted by reaction $$CO + H_2 + O_2 \rightarrow CO_2 + H_2O \qquad (II)$$

While the invention has been described above with respect to certain of its preferred embodiments, it is respectfully pointed out that many variations and modifications are possible within the scope of the present invention and it is anticipated that many such variations and modifications may appear obvious or desirable to those skilled in the art based upon a review of the foregoing description of preferred embodiments.

Having described the invention, we claim:

1. A method of fuel treatment and distribution for feeding liquid alcohol mixed with dissociated alcohol into an internal combustion engine comprising the sequence of steps as follows:
   (a) continuously vaporizing alcohol pumped from an alcohol storage means to continuously form alcohol vapor;
   (b) continuously catalytically dissociating said alcohol vapor in a dissociator means of a capacity no more than sufficient for normal operation to continuously form a hydrogen-rich gaseous fuel mixture;
   (c) continuously mixing air with said hydrogen-rich gaseous fuel mixture to form a gaseous combustion mixture;
   (d) continuously burning said gaseous combustion mixture in an internal combustion engine;
   (e) intermittently atomizing liquid alcohol in an atomization means to form atomized liquid alcohol during periods of peak operating capacity and during said continuously vaporizing, dissociating, mixing and burning, said liquid alcohol atomized being pumped directly from said alcohol storage means to said atomization means;
   (f) mixing said atomized liquid alcohol and said gaseous combustion mixture to form an energy enriched combustion mixture;
   whereby said continuous burning of said combustion mixture is intermittently energy enriched during periods of peak operating capacity and power demand.

2. The method of claim 1 wherein said alcohol is methanol.

3. A method of fuel treatment and distribution for feeding liquid alcohol mixed with dissociated alcohol into an internal combustion engine comprising the sequence of steps as follows:
(a) continuously vaporizing alcohol pumped from an alcohol storage means to continuously form alcohol vapor;
(b) continuously catalytically dissociating said alcohol vapor in a dissociator means of a capacity no more than sufficient for normal operation to continuously form a hydrogen-rich gaseous fuel mixture;
(c) continuously mixing air with said hydrogen-rich gaseous fuel mixture to form a gaseous combustion mixture;
(d) continuously burning said gaseous combustion mixture in an internal combustion engine;
intermittently atomizing liquid alcohol in an atomization means to form atomized liquid alcohol during periods of peak operating capacity and during said continuously vaporizing, dissociating, mixing and burning, said liquid alcohol atomized being pumped directly from said alcohol storage means to said atomization means;
(f) mixing said atomized liquid alcohol and said gaseous combustion mixture to form an energy enriched combustion mixture;
(g) storing a portion of said hydrogen-rich gaseous fuel mixture in a storage vessel having an outlet valve means said storing being between the end of one period of operation and the following a first start-up;
(h) opening said outlet valve means;
(i) mixing said stored hydrogen-rich gaseous fuel mixture with air and atomized liquid alcohol to form a start-up combustion mixture;
(j) starting said internal combustion engine on said start-up combustion mixture as a second start-up;
whereby said continuous burning of said combustion mixture is intermittently energy enriched during periods of peak operating capacity and power demand.

4. The method of claim 3 wherein said alcohol is methanol.

5. The method of claim 3 wherein said dissociator means comprises copper/zinc catalyst maintained at about 600° F.

* * * * *